(12) United States Patent
Muta et al.

(10) Patent No.: US 11,320,276 B2
(45) Date of Patent: May 3, 2022

(54) VEHICLE CONTROL SYSTEM AND METHOD FOR COORDINATING IN-PERSON MEETINGS

(71) Applicant: TOYOTA JIDOSHA KABUSHIKI KAISHA, Toyota (JP)

(72) Inventors: Takahiro Muta, Mishima (JP); Eisuke Ando, Nagoya (JP); Takao Hishikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 16/262,434

(22) Filed: Jan. 30, 2019

(65) Prior Publication Data
US 2019/0250003 A1 Aug. 15, 2019

(30) Foreign Application Priority Data
Feb. 15, 2018 (JP) .............................. JP2018-024924

(51) Int. Cl.
*G01C 21/34* (2006.01)
*G05D 1/02* (2020.01)
*G08G 1/00* (2006.01)

(52) U.S. Cl.
CPC ....... *G01C 21/3438* (2013.01); *G05D 1/0285* (2013.01); *G08G 1/202* (2013.01); *G05D 2201/0213* (2013.01)

(58) Field of Classification Search
None
See application file for complete search history.

(56) References Cited

U.S. PATENT DOCUMENTS

| 9,373,207 | B2 * | 6/2016 | Ricci | G06Q 30/0265 |
| 10,469,548 | B1 * | 11/2019 | Ledet | H04L 67/18 |
| 10,753,754 | B2 * | 8/2020 | DeLizio | G01C 21/3407 |
| 2007/0159309 | A1 * | 7/2007 | Ito | G16H 10/20 |
| | | | | 340/425.5 |
| 2015/0324717 | A1 * | 11/2015 | Lord | G06Q 10/06 |
| | | | | 705/7.13 |
| 2016/0048777 | A1 * | 2/2016 | Kitagawa | G06Q 10/025 |
| | | | | 705/6 |
| 2017/0132934 | A1 * | 5/2017 | Kentley | G08G 1/202 |
| 2017/0294130 | A1 * | 10/2017 | Donnelly | H04W 4/40 |
| 2018/0113460 | A1 * | 4/2018 | Koda | B60W 60/0011 |

(Continued)

FOREIGN PATENT DOCUMENTS

| JP | H09-183334 A | 7/1997 |
| JP | H11-184521 A | 7/1999 |

(Continued)

*Primary Examiner* — James J Lee
*Assistant Examiner* — Tawri M Matsushige
(74) *Attorney, Agent, or Firm* — Oliff PLC

(57) ABSTRACT

Provided is a vehicle control system including a plurality of vehicles, a storage that stores information relating to a user who is on a vehicle for each of the plurality of vehicles, at least one processor configured to receive a matching request for requesting meeting with a user who is on one of the plurality of vehicles, specify a first vehicle which a first user matching the matching request is on, on the basis of the information stored in the storage and perform control on the first vehicle so as to let the first vehicle and a requesting source of the matching request meet each other.

6 Claims, 12 Drawing Sheets

(56) References Cited

U.S. PATENT DOCUMENTS

| | | | | |
|---|---|---|---|---|
| 2018/0128628 A1* | 5/2018 | Cheaz | ................... | H04W 84/00 |
| 2018/0164106 A1* | 6/2018 | Peterson | ............ | G01C 21/3438 |
| 2019/0035267 A1* | 1/2019 | Balzer | ...................... | G08G 1/07 |

FOREIGN PATENT DOCUMENTS

| | | | |
|---|---|---|---|
| JP | 2003-109175 | A | 4/2003 |
| JP | 2009-211526 | A | 9/2009 |
| JP | 2015-179332 | A | 10/2015 |

* cited by examiner

FIG.6

VEHICLE MANAGEMENT INFORMATION TABLE

| VEHICLE ID | INITIAL LOCATION | CURRENT LOCATION | SERVICE STATE | SERVICE ID | BOARDING USER ID |
|---|---|---|---|---|---|
| V001 | P1 | P1 | SERVICING | S001 | U001 |
| V002 | P2 | P2 | NOT SERVICING | – | – |
| V003 | P3 | P3 | NOT SERVICING | – | – |
| V004 | P4 | P4 | NOT SERVICING | – | – |
| V005 | P5 | P5 | SERVICING | S002, S005 | U005 |

VEHICLE CONTROL SYSTEM AND METHOD FOR COORDINATING IN-PERSON MEETINGS

CROSS-REFERENCE TO RELATED APPLICATION

This application claims the benefit of Japanese Patent Application No. 2018-024924, filed on Feb. 15, 2018, which is hereby incorporated by reference herein in its entirety.

BACKGROUND

Technical Field

The present disclosure relates to a vehicle control system and a vehicle control method.

Description of the Related Art

A mobile office in which office equipment is provided within a vehicle is disclosed (for example, Patent document 1). In the mobile office, a passenger can do clerical work even while the vehicle is traveling.

CITATION LIST

Patent Document

Patent document 1: Japanese Patent Laid-Open No. H09-183334

However, for example, there is a case where users who do clerical work within mobile offices have needs for meeting and consulting each other.

The present disclosure has been made in view of various actual circumstances as described above, and an object of the present disclosure is to provide a vehicle control system and a vehicle control method which enable meeting with another user who is on a vehicle.

SUMMARY

One aspect of the present disclosure is a vehicle control system including a plurality of vehicles, a storage that stores information relating to a user who is on a vehicle for each of the plurality of vehicles, at least one processor configured to receive a matching request for requesting meeting with a user who is on one of the plurality of vehicles; specify a first vehicle which a first user matching the matching request is on, on the basis of the information stored in the storage; and perform control on the first vehicle so as to let the first vehicle and a requesting source of the matching request meet each other. Each of the plurality of vehicles is, for example, a manned-driven or unmanned-driven car.

By this, a user who is the requesting source of the matching request can meet the first user. Further, for the first user who is on the first vehicle, a time period during which the first user is on the first vehicle is highly likely to be a vacant time period or an idle time period, and, according to one aspect of the present disclosure, it is possible to effectively utilize the vacant time period.

Further, in one aspect of the present disclosure, each of the plurality of vehicles may be a vehicle which can autonomously travel on the basis of a move command, and the at least one processor may be configured to determine a meeting point for meeting with the requesting source and may transmit the move command for moving to the meeting point to the first vehicle as the control on the first vehicle. In the case where the vehicle is a vehicle which can autonomously travel, for example, the vehicle control system can control the vehicle more easily than a manned-driven vehicle, so that the vehicle control system can more easily let the user who is the requesting source of the matching request and the first user meet each other. Further, in the case where the vehicle is a vehicle which can autonomously travel, for the first user who is on the first vehicle, a time period during which the first user is on the first vehicle is more likely to be a vacant time period or an idle time period, so that it is possible to effectively utilize the vacant time period.

Further, in one aspect of the present disclosure, each of the plurality of vehicles may be a vehicle which can autonomously travel, and the requesting source of the matching request may be a vehicle other than the first vehicle among the plurality of vehicles, and may be a second vehicle which a second user is on.

In this case, the at least one processor may be configured to transmit the move command for moving to the meeting point also to the second vehicle. By both the first vehicle and the second vehicle being headed to the meeting point, it is possible to let the first user and the second user meet each other sooner. Further, because the second vehicle which is the requesting source is also a vehicle which can autonomously travel, for the second user, a time period during which the second user is on the second vehicle is highly likely to be a vacant time period, so that it is possible to effectively utilize the vacant time period for both the first user and the second user.

Further, in one aspect of the present disclosure, the requesting source of the matching request may be a user terminal of the second user. By this, even if the requesting source of the matching request is a user terminal, it is possible to let the user (second user) who is the requesting source and the first user meet each other.

Further, in one aspect of the present disclosure, the requesting source of the matching request may be a user terminal of the second user who is on the second vehicle other than the first vehicle among the plurality of vehicles. In this case, the at least one processor may be configured to transmit the move command for moving to the meeting point also to the second vehicle. By this, in the case where the second user is on the second vehicle, because both the first vehicle and the second vehicle are headed to the meeting point, the first user and the second user can meet each other sooner.

Further, in one aspect of the present disclosure, the requesting source of the matching request may be a user terminal of the second user who is on none of the plurality of vehicles. In this case, for example, the at least one processor may be configured to transmit a move command for moving to a location of the user terminal, a getting-on command for the second user at the location of the user terminal, and a move command for moving to the meeting point from the location of the user terminal, to the second vehicle other than the first vehicle among the plurality of vehicles. By this, because the second vehicle is headed to the second user, lets the second user on and is headed to the meeting point, even in the case where the second user is not on the second vehicle, the first user and the second user can meet each other sooner.

Further, in one aspect of the present disclosure, in the case where the first vehicle and the second vehicle are vehicles which can autonomously travel, and, in the case where the first vehicle and the second vehicle meet each other at the meeting point, and one of the first user and the second user changes the vehicle to the second vehicle or the first vehicle, the control unit may transmit a move command for moving to a predetermined location to a vehicle which the user is not on out of the first vehicle and the second vehicle. By this, because a vehicle which the user is not on returns to the predetermined location, the vehicle can be easily managed.

Further, in one aspect of the present disclosure, in a case where at least one processor may be configured to notify the first vehicle of a confirmation request as to the matching request and when a response is received from the first vehicle, the at least one processor may be configured to perform control on the first vehicle. By this, it is possible to determine whether or not to let the user who is the matching request source and the first user who is on the first vehicle meet each other while taking into account a state of the first user who is on the first vehicle.

Note that the vehicle control system of the present disclosure may be configured with one or a plurality of processing apparatuses such as computers. In the case where the vehicle control system is configured with a plurality of processing apparatuses, respective components of the vehicle control system are provided at the plurality of processing apparatuses in a dispersed manner, and the respective processing apparatuses implement processing as the vehicle control system in cooperation with each other.

The present disclosure can be viewed from an aspect of a vehicle control method. In the vehicle control method, a control apparatus that controls a plurality of vehicles stores information relating to a user who is on a vehicle in a storage for each of the plurality of vehicles, receives a matching request for match with a user who is on one of the plurality of vehicles, specifies a first vehicle which a first user matching the matching request is on, on the basis of the information stored in the storage unit, and performs control on the first vehicle so as to let the first vehicle and a requesting source of the matching request meet each other. Note that technical idea disclosed regarding the above-described vehicle control system can be also applied to the vehicle control method within a range which does not cause technical variance.

According to the present disclosure, it is possible to let a user and another user who is on a vehicle meet each other.

BRIEF DESCRIPTION OF DRAWINGS

FIG. 6 is one example of the vehicle management information table;

DESCRIPTION OF THE EMBODIMENTS

Embodiments of the present disclosure will be described below on the basis of the drawings. Configurations of the embodiments described below are examples, and the present disclosure is not limited to the configurations of the embodiments.

<EV Palette>

In the present embodiment, a self-propelled electric vehicle called an electric vehicle (EV) palette provides various functions or service to a user in cooperation with a computer system on a network. The EV palette of the present embodiment (hereinafter, simply referred to as an EV palette) is a mobile body which can perform automated driving and unmanned driving, and there are EV palettes with various sizes in accordance with application. For example, various EV palettes including a small EV palette which can be utilized in place of a suitcase and a large EV palette which can carry a person and an object, can be utilized.

Further, the EV palette has an information processing apparatus and a communication apparatus for controlling the EV palette, providing a user interface with a user who utilizes the EV palette, transmitting and receiving information with various kinds of servers on a network, or the like. The EV palette provides functions and services added by various kinds of servers on the network to the user in addition to processing which can be executed by the EV palette alone, in cooperation with various kinds of servers on the network.

First Embodiment

<Outline of System>

Figure 1:
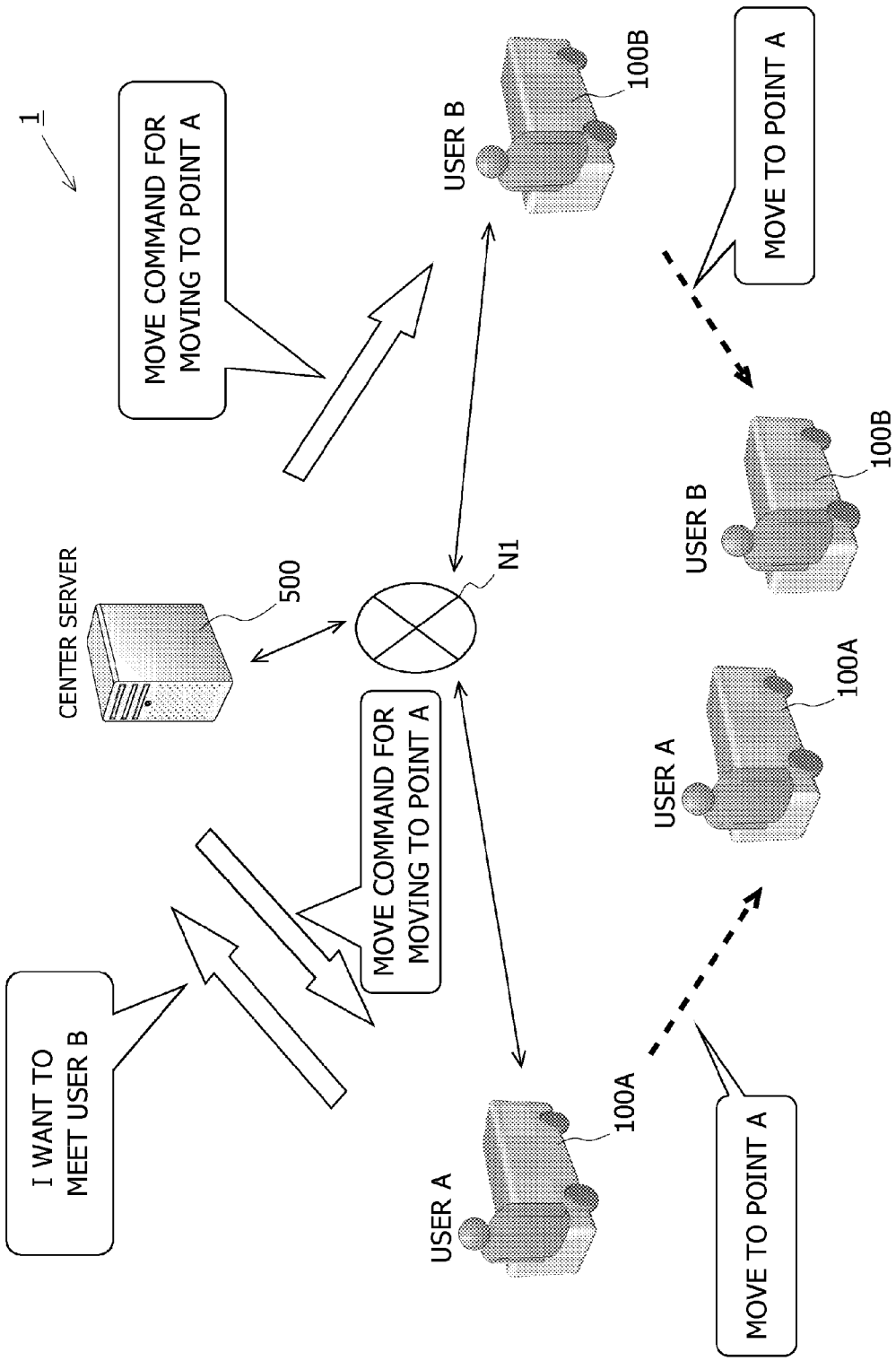
FIG. 1 is a diagram illustrating an example of a system configuration of a vehicle control system according to a first embodiment.

FIG. 1 is a diagram illustrating an example of a system configuration of a vehicle control system 1 according to a first embodiment. The vehicle control system 1 includes a plurality of vehicles 100, and a center server 500 which manages the plurality of vehicles 100. The vehicle control system 1 is a system which provides matching service in which the center server 500 lets two vehicles 100 meet each other.

Each of the plurality of vehicles 100 is, for example, connected to network N1 via a wireless communication network, and is connected to the center server 500 through network N1. Each of the vehicles 100 performs mobile communication such as, for example, 3G, LTE (Long Term Evolution) and LTE-Advanced and wireless communication in accordance with standards of a wireless LAN such as WiFi.

The vehicle 100 is, for example, an EV palette. The EV palette is a mobile body which carries a person or an object and which can travel through automated driving and unmanned driving. The EV palette has a user interface by computer control, accepts a request from a user, responds to the user, executes predetermined processing in response to the request from the user and reports a processing result to the user. For example, the EV palette accepts an instruction from the user from speech, an image or input/output equipment of a computer, and executes processing. Further, the EV palette recognizes the user from an image, speech, or the like, of the user, and follows the user in accordance with movement of the user. However, the EV palette notifies the center server 500 of the request from the user for a request which is unable to be processed by the EV palette alone, and executes processing in cooperation with the center server 500. Examples of the request which is unable to be processed by the EV palette alone can include, for example, requests for acquisition of information from a database on the center server 500, recognition or inference by learning machine, or the like. Note that the vehicle 100 is not limited to the EV palette and may be, for example, a freight car which is driven by a person.

The vehicle 100 creates an operation plan in response to an operation command from the center server 500 and performs autonomous traveling to a destination in accordance with the operation plan. The vehicle 100 includes means for acquiring location information, acquires location information with a predetermined period and transmits the location information to the center server 500. Further, the vehicle 100 transmits a getting-on notification or a getting-off notification of a user to the center server 500 in accordance with input from the user who gets on or gets off the vehicle 100.

The center server 500 controls the vehicle 100. More specifically, the center server 500 holds location information of the vehicle 100, and information of the user who is on the vehicle 100 in a vehicle management database. The center server 500, for example, accepts a matching request for match with a user B from a vehicle 100A which a user A is on, extracts a vehicle 100B which the user B is on from the vehicle management database, determines a meeting point and time and transmits an operation command to the vehicle 100A and the vehicle 100B.

The vehicle 100 calculates an operation route and starts operation in response to the operation command from the center server 500 and moves toward the meeting point until the designated time. In the first embodiment, it is assumed that the vehicle 100 is an EV palette. The vehicle 100 and the EV palette are one example of a "vehicle". A user who is a target of the matching request is one example of a "first user". The vehicle 100 which the user who is the target of the matching request is on is one example of a "first vehicle". The vehicle 100 which is a transmission source of the matching request in the first embodiment is one example of a "second vehicle". A user who is on the vehicle 100 which is the transmission source of the matching request in the first embodiment is one example of a "second user". The center server 500 is one example of a "control apparatus".

Figure 2:
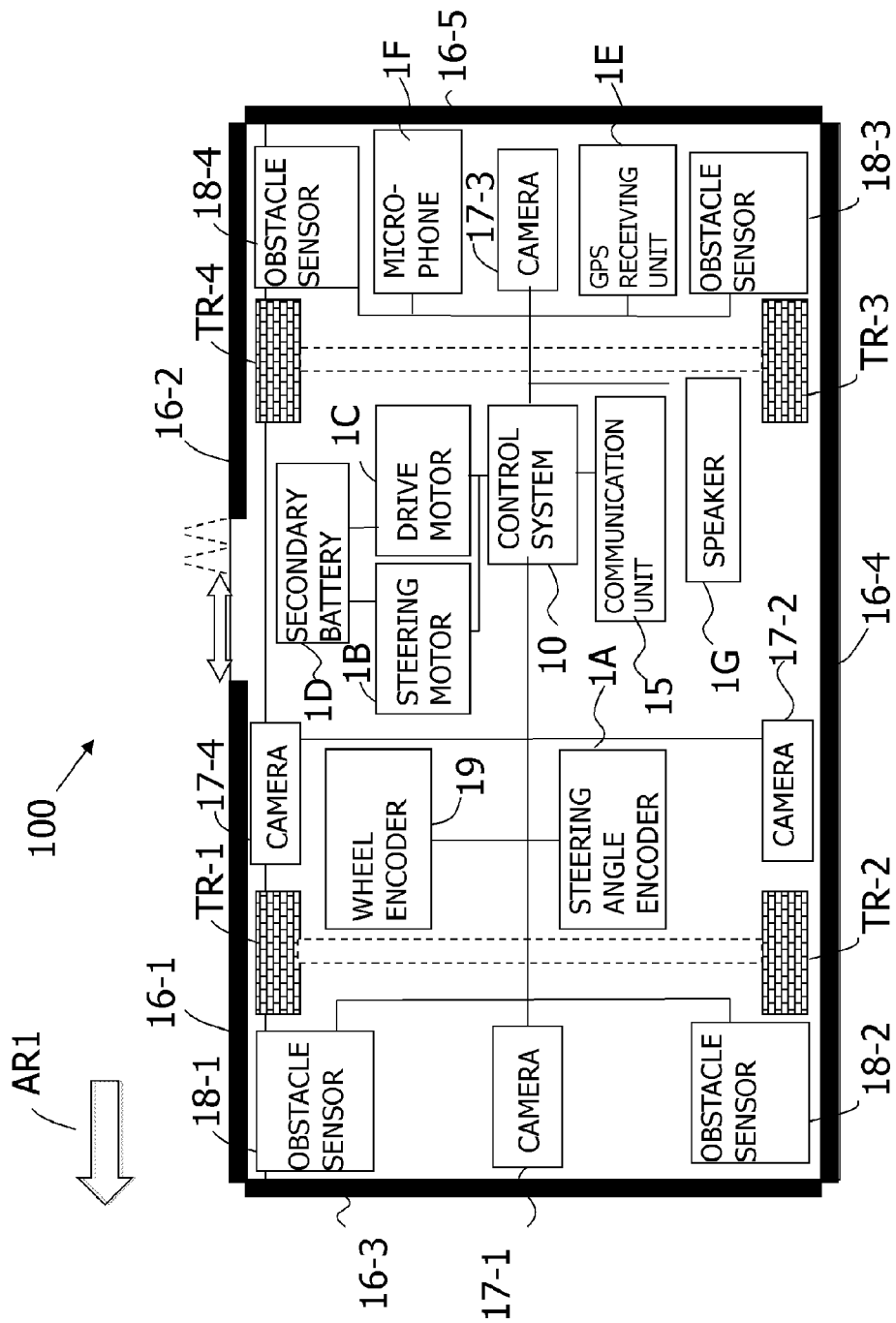
FIG. 2 is a diagram illustrating one example of a hardware configuration of the vehicle.
Figure 3:
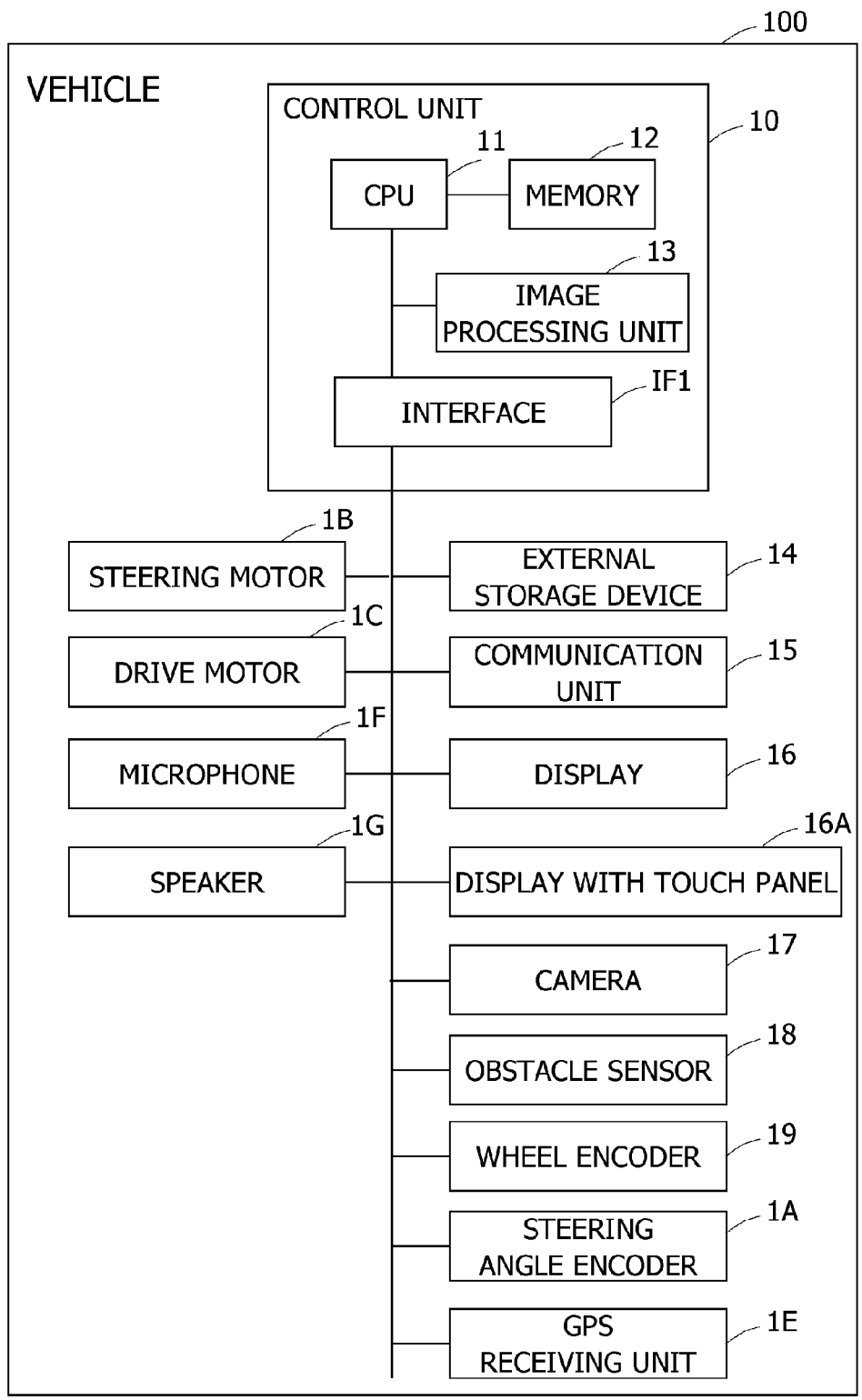
FIG. 3 is a diagram illustrating one example of a hardware configuration of a control system mounted on an EV palette and each unit relating to the control system.

FIG. 2 is a diagram illustrating one example of a hardware configuration of the vehicle 100. FIG. 3 is a diagram illustrating one example of a hardware configuration of a control system 10 mounted on an EV palette and each unit relating to the control system 10. FIG. 2 and FIG. 3 are diagrams in the case where an EV palette is employed as the vehicle 100. In FIG. 2 and FIG. 3, description will be provided assuming that the vehicle 100 is an EV palette 100.

The EV palette 100 includes a boxlike body, and four wheels TR1 to TR4 provided at anterior and posterior portions in a traveling direction at both sides of a lower part of the body. The four wheels TR1 to TR4 are coupled to a drive shaft which is not illustrated and are driven by a drive motor 1C illustrated in FIG. 2 and FIG. 3. Further, the traveling direction upon traveling of the four wheels TR1 to TR4 (a parallel direction to a plane of rotation of the four wheels TR1 to TR4) is displaced relatively with respect to the body by a steering motor 1B illustrated in FIG. 2 and FIG. 3, so that the traveling direction is controlled.

As illustrated in FIG. 2, on an external wall of the body of the EV palette 100, displays 16-1 to 16-5 are fixed. The displays 16-1 to 16-5 are, for example, liquid crystal displays, electro luminescence panels, or the like. In the case where the displays 16-1 to 16-5 are referred to without distinction, they will be collectively referred to as a display 16.

Now, in FIG. 2, it is assumed that the EV palette 100 travels in a direction of an arrow AR1. Therefore, it is assumed that a left direction in FIG. 2 is the traveling direction. Therefore, in FIG. 2, a side surface on the traveling direction side of the body will be referred to as an anterior surface of the EV palette 100, and a side surface in a direction opposite to the traveling direction will be referred to as a posterior surface of the EV palette 100. Further, a side surface on a right side with respect to the traveling direction of the body will be referred to as a right side surface, and a side surface on a left side will be referred to as a left side surface.

As illustrated in FIG. 2, the EV palette 100 has obstacle sensors 18-1 and 18-2 at locations close to corner portions on both sides on the anterior surface, and has obstacle sensors 18-3 and 18-4 at locations close to corner portions on both sides on the posterior surface. Further, the EV palette 100 has cameras 17-1, 17-2, 17-3 and 17-4 respectively on the anterior surface, the left side surface, the posterior surface and the right side surface. In the case where the obstacle sensors 18-1, or the like, are referred to without distinction, they will be collectively referred to as an obstacle sensor 18 in the present embodiment. Further, in the case where the cameras 17-1, 17-2, 17-3 and 17-4 are referred to without distinction, they will be collectively referred to as a camera 17 in the present embodiment.

Further, the EV palette 100 includes the steering motor 1B, the drive motor 1C, and a secondary battery 1D which supplies power to the steering motor 1B and the drive motor 1C. Further, the EV palette 100 includes a wheel encoder 19 which detects a rotation angle of the wheel each second, and a steering angle encoder 1A which detects a steering angle which is the traveling direction of the wheel. Still further, the EV palette 100 includes the control system 10, a communication unit 15, a GPS receiving unit 1E, a microphone 1F and a speaker 1G. Note that, while not illustrated, the secondary battery 1D supplies power also to the control system 10, or the like. However, a power supply which supplies power to the control system 10, or the like, may be provided separately from the secondary battery 1D which supplies power to the steering motor 1B and the drive motor 1C.

The control system 10 is also referred to as an Electronic Control Unit (ECU). As illustrated in FIG. 3, the control system 10 includes a CPU 11, a memory 12, an image processing unit 13 and an interface IF1. To the interface IF1, an external storage device 14, the communication unit 15, the display 16, a display with a touch panel 16A, the camera 17, the obstacle sensor 18, the wheel encoder 19, the steering angle encoder 1A, the steering motor 1B, the drive motor 1C, the GPS receiving unit 1E, the microphone 1F, the speaker 1G, a BLE communication unit 1H, a locking/unlocking apparatus 150, or the like, are connected.

The obstacle sensor 18 is an ultrasonic sensor, a radar, or the like. The obstacle sensor 18 emits an ultrasonic wave, an electromagnetic wave, or the like, in a detection target direction, and detects existence, a location, relative speed, or the like, of an obstacle in the detection target direction on the basis of a reflected wave.

The camera 17 is an imaging apparatus using an image sensor such as Charged-Coupled Devices (CCD) and a Metal-Oxide-Semiconductor (MOS) or a Complementary Metal-Oxide-Semiconductor (CMOS). The camera 17 acquires an image at predetermined time intervals called a frame period, and stores the image in a frame buffer which is not illustrated, within the control system 10. An image stored in the frame buffer with a frame period is referred to as frame data.

The steering motor 1B controls a direction of a cross line on which a plane of rotation of the wheel intersects with a horizontal plane, that is, an angle which becomes a traveling direction by rotation of the wheel, in accordance with an instruction signal from the control system 10. The drive motor 1C, for example, drives and rotates the wheels TR1 to TR4 in accordance with the instruction signal from the control system 10. However, the drive motor 1C may drive one pair of wheels TR1 and TR2 or the other pair of wheels TR3 and TR4 among the wheels TR1 to TR4. The secondary battery 1D supplies power to the steering motor 1B, the drive motor 1C and parts connected to the control system 10.

The steering angle encoder 1A detects a direction of the cross line on which the plane of rotation of the wheel intersects with the horizontal plane (or an angle of the rotating shaft of the wheel within the horizontal plane), which becomes the traveling direction by rotation of the wheel, at predetermined detection time intervals, and stores the direction in a register which is not illustrated, in the control system 10. For example, a direction to which the rotating shaft of the wheel is orthogonal with respect to the traveling direction (direction of the arrow AR1) in FIG. 2 is set as an origin of the angle. Further, the wheel encoder 19 acquires rotation speed of the wheel at predetermined detection time intervals, and stores the rotation speed in a register which is not illustrated, in the control system 10.

The communication unit 15 is, for example, a communication unit for performing communication with various kinds of servers, or the like, on a network through a mobile phone base station and a public communication network connected to the mobile phone base station. The communication unit 15 performs wireless communication using a wireless signal and a wireless communication scheme conforming to predetermined wireless communication standards.

The global positioning system (GPS) receiving unit 1E receives radio waves of time signals from a plurality of satellites (Global Positioning Satellites) which orbit the earth and stores the time signal in a register which is not illustrated, in the control system 10. The microphone 1F detects speech, converts the speech into a digital signal and stores the digital signal in a register which is not illustrated, in the control system 10. The speaker 1G is driven by a D/A converter and an amplifier connected to the control system 10 or a signal processing unit which is not illustrated, and reproduces acoustic including sound and speech.

The CPU 11 of the control system 10 executes a computer program expanded at the memory 12 so as to be able to be executed, and executes processing as the control system 10. The memory 12 stores a computer program to be executed by the CPU 11, data to be processed by the CPU 11, or the like. The memory 12 is, for example, a Dynamic Random Access Memory (DRAM), a Static Random Access Memory (SRAM), a Read Only Memory (ROM), or the like. The image processing unit 13 processes data in the frame buffer obtained for each predetermined frame period from the camera 17 in cooperation with the CPU 11. The image processing unit 13, for example, includes a GPU and an image memory which becomes the frame buffer. The external storage device 34, which is a non-volatile memory, is, for example, a Solid State Drive (SSD), a hard disk drive, or the like.

For example, as illustrated in FIG. 3, the control system 10 acquires a detection signal from a sensor of each unit of the EV palette 100 via the interface IF1. Further, the control system 10 calculates latitude and longitude which is a location on the earth from the detection signal from the GPS receiving unit 1E. Still further, the control system 10 acquires map data from a map information database stored in the external storage device 14, matches the calculated latitude and longitude to a location on the map data and determines a current location. Further, the control system 10 acquires a route to a destination from the current location on the map data. Still further, the control system 10 detects an obstacle around the EV palette 100 on the basis of signals from the obstacle sensor 18, the camera 17, or the like, determines the traveling direction so as to avoid the obstacle and controls the steering angle.

Further, the control system 10 processes images acquired from the camera 17 for each frame data in cooperation with the image processing unit 13, for example, detects change based on a difference in images and recognizes an obstacle. Further, the control system 10 recognizes a user in each frame data of the images from the camera 17, maintains a distance to the user at a predetermined value and follows movement of the user. Further, the control system 10 recognizes gesture of the user in the frame data of images from the camera 17 and responds to the user's will obtained from the recognized gesture. Still further, the control system 10 analyzes a speech signal obtained from the microphone 1F and responds to the user's will obtained from speech recognition. Note that the control system 10 may transmit the frame data of the images from the camera 17 and speech data obtained from the microphone 1F to the center server 500 on the network from the communication unit 15. The analysis of the frame data of the images and the speech data may be shared with the center server 500.

Still further, the control system 10 displays an image, characters and other information on the display 16. Further, the control system 10 detects operation to the display with the touch panel 16A and accepts an instruction from the user. Further, the control system 10 responds to the instruction from the user via the display with the touch panel 16A, the camera 17 and the microphone 1F, from the display 16, the display with the touch panel 16A or the speaker 1G.

While the interface IF1 is illustrated in FIG. 3, a path for transmission and reception of signals between the control system 10 and a control target is not limited to the interface IF1. That is, the control system 10 may have a plurality of signal transmission and reception paths other than the interface IF1. Further, in FIG. 3, the control system 10 has a single CPU 11. However, the CPU is not limited to a single processor and may employ a multiprocessor configuration. Further, a signal CPU connected with a single socket may employ a multicore configuration. Processing of at least part of the above-described units may be executed by processors other than the CPU, for example, at a dedicated processor such as a Digital Signal Processor (DSP) and a Graphics Processing Unit (GPU). Further, at least part of processing of the above-described units may be archived by an integrated circuit (IC) or other digital circuits. Still further, at least part of the above-described units may include analog circuits.

Figure 4:
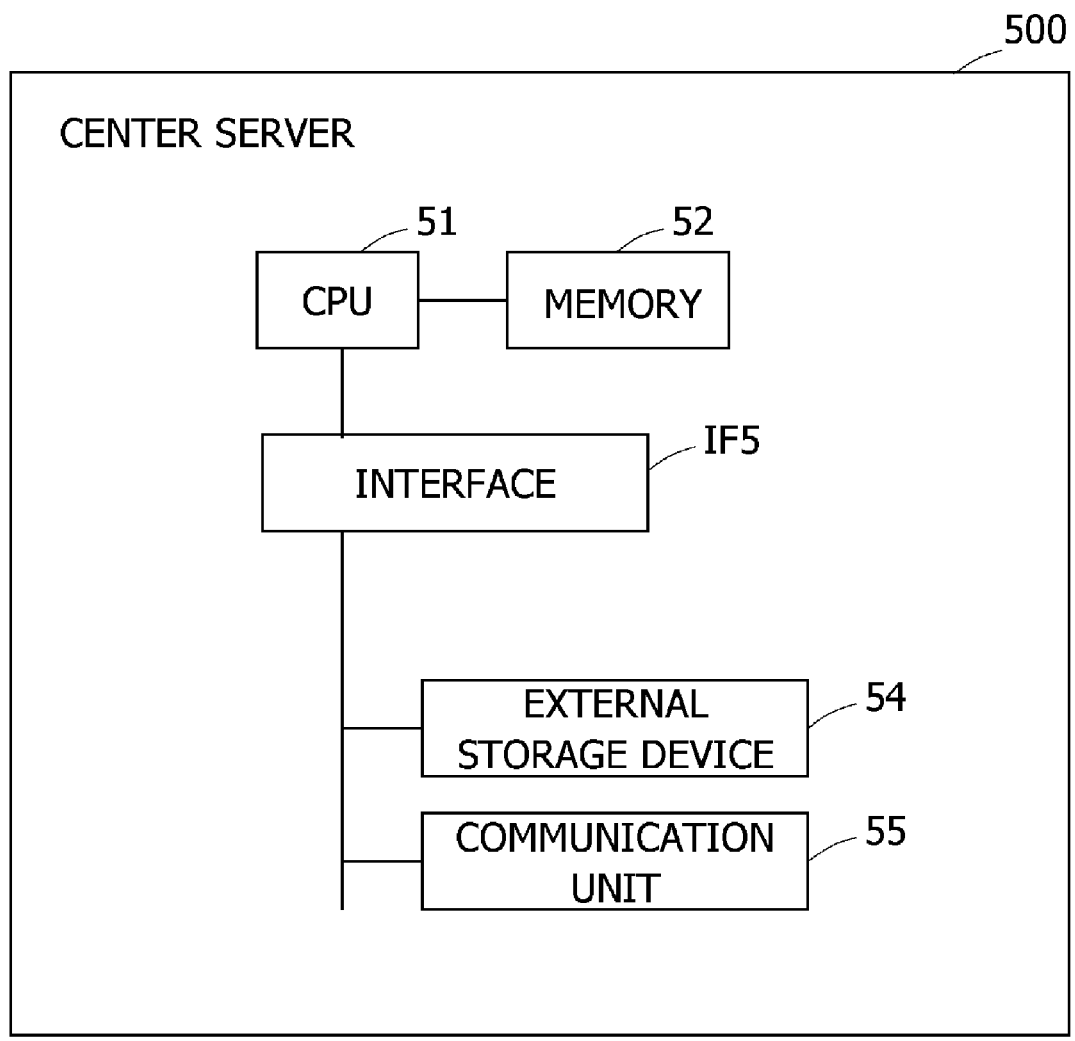
FIG. 4 is a diagram illustrating a hardware configuration of the center server.

FIG. 4 is a diagram illustrating a hardware configuration of the center server 500. The center server 500 includes a CPU 51, a memory 52, an interface IF5, an external storage device 54 and a communication unit 55. Configurations and operation of the CPU 51, the memory 52, the interface IF5 and the external storage device 54 are similar to those of the CPU 11, the memory 12, the interface IF1 and the external storage device 14 in FIG. 2. The communication unit 55 is, for example, connected to a public communication network through a LAN, and performs communication with various kinds of servers, or the like, on the network through the public communication network. The CPU 51 is one example of a "processor", and the external storage device 54 is one example of a "storage".

Figure 5:
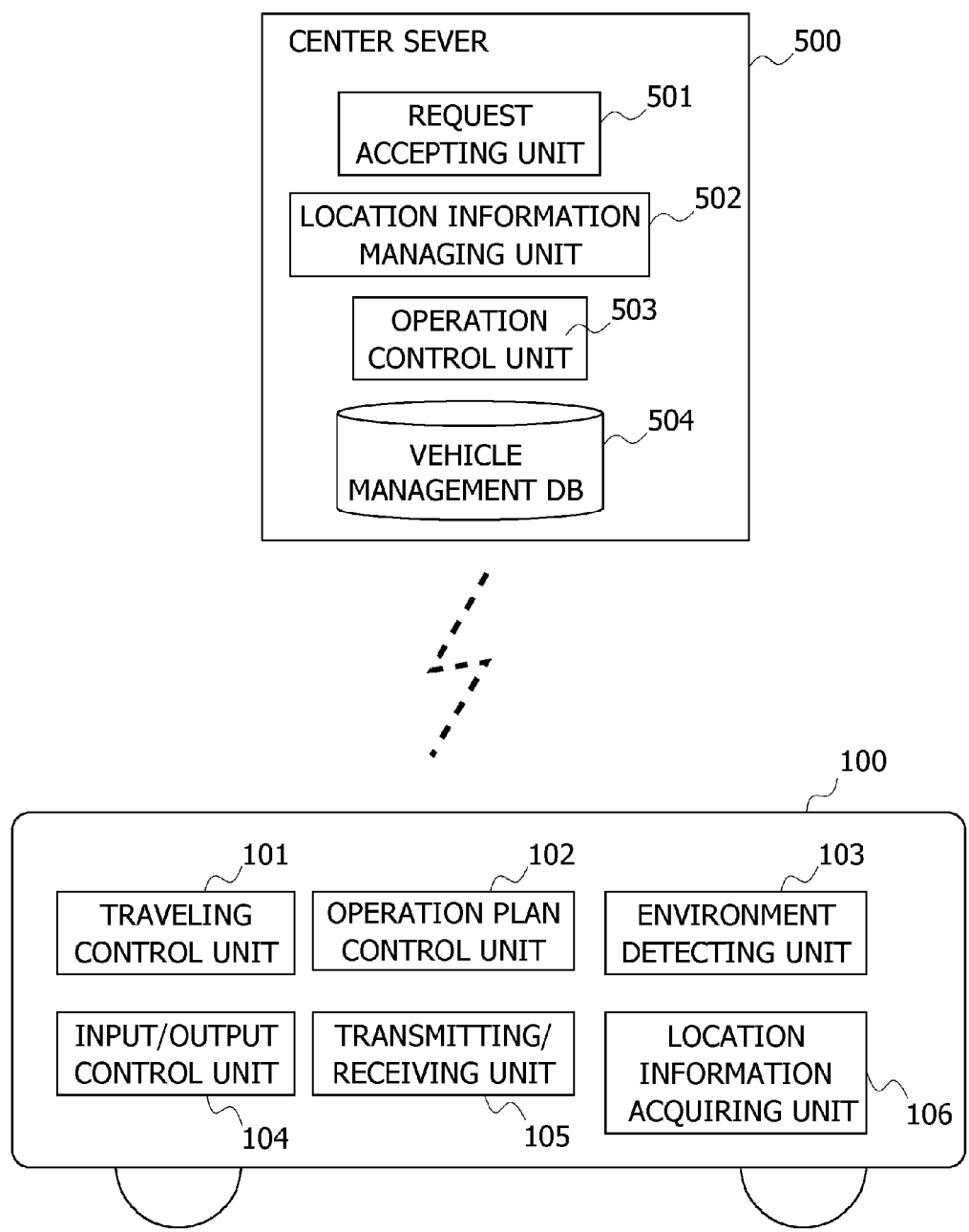
FIG. 5 is a diagram illustrating one example of a functional configuration of the center server and the vehicle in the vehicle control system.

FIG. 5 is a diagram illustrating one example of a functional configuration of the center server 500 and the vehicle 100 in the vehicle control system 1. The center server 500 operates as each unit illustrated in FIG. 5 by a computer program on the memory 52. That is, the center server 500 includes a request accepting unit 501, a location information managing unit 502, an operation control unit 503, and a vehicle management database (DB) 504 as functional components.

The request accepting unit 501, for example, accepts a matching request for match with a user from the vehicle 100. The matching request is a request for meeting with a target user. The matching request includes, for example, identification information of the target user. Note that a method for designating the user who becomes a target of the matching request may be, for example, a method in which identification information of the user is directly input on the display with the touch panel 16A of the vehicle 100, or may be a method in which the user is selected from a list of users displayed on the display with the touch panel 16A of the vehicle 100. Note that, in the case where the center server 500 is used by a plurality of organizations which subscribe to the matching service, while it is possible to designate a user who belongs to the same organization as organization of a target of the matching request, it is not possible to designate a user who belongs to a different organization.

Therefore, in a case of the method in which the user who is the target of the matching request is selected from a list of users, the users displayed in the list are users who are allowed to share information among the users, such as, for example, users belonging to the same organization as the organization of the user who makes a matching request. However, the method for designating the user who is the target of the matching request is not limited to these.

The location information managing unit 502, for example, receives location information transmitted from each vehicle 100 with a predetermined period and registers the location information in a vehicle management DB 504 which will be described later.

For example, in the case where the matching request is accepted, the operation control unit 503 specifies the vehicle 100 which the user who is the target of the matching request is on. The operation control unit 503 determines a meeting point for the vehicle 100 which is a requesting source and the vehicle 100 which is the target of the matching request to meet each other, and estimated meeting time, and transmits the operation command including the meeting point and the estimated meeting time to the vehicle 100 which is the requesting source and the vehicle 100 which is the target of the matching request. Details of the processing of the operation control unit 503 will be described later.

The vehicle management DB 504 is, for example, created within the external storage device 54 of the center server 500. The vehicle management DB 504, for example, stores a vehicle management information table which holds information relating to the respective vehicles 100 within the vehicle control system 1. Details of the vehicle management information table will be described later.

One of the functional components of the center server 500 or part of the processing may be executed by other computers connected to the network. Further, while a series of processing to be executed at the center server 500 can be executed by hardware, the series of processing can be also executed by software.

Then, the vehicle 100 operates as each unit illustrated in FIG. 5 by a computer program on the memory. The vehicle 100 includes, for example, a traveling control unit 101, an operation plan control unit 102, an environment detecting unit 103, an input/output control unit 104, a transmitting/receiving unit 105 and a location information acquiring unit 106 as functional components.

The transmitting/receiving unit 105 is an interface with the center server 500. The transmitting/receiving unit 105, for example, transmits data input from other functional components to the center server 500 via the communication unit 15, receives data from the center server 500 through the communication unit 15 and outputs the data to a predetermined functional component.

The input/output control unit 104, for example, accepts operation input from the user with respect to the vehicle 100 and creates a request or a notification in accordance with the operation input. Means for accepting operation input from the user is, for example, the display with the touch panel 16A, a hardware switch (not illustrated) and an integrated circuit (IC) card reader (not illustrated). For example, the input/output control unit 104 outputs an operation screen on the display with the touch panel 16A. Examples of the operation screen displayed on the display with the touch panel 16A include, for example, a screen including each of an input field or a list of information of the user who is the target of the matching request, an icon for inputting completion of meeting with the user who is the target of the matching request, an icon for inputting termination of usage of the vehicle 100, or the like. The input/output control unit 104, for example, generates the matching request, a matching service completion notification, a notification that usage of the vehicle 100 is finished, or the like, on the basis of operation performed by the user with respect to the display with the touch panel 16A.

Further, for example, each user holds an IC card in which identification information of the user is recorded. When the user gets on or gets off the vehicle 100, the user brings the IC card closer to an IC card reader provided at the vehicle 100 to cause the IC card reader to read the identification information of the user. The input/output control unit 104, for example, accepts input of the identification information of the user from the IC card reader and generates a getting-on notification or a getting-off notification including the identification information of the user.

For example, the matching request, the notification of completion of the matching service, the notification of termination of usage of the vehicle 100, the getting-on notification and the getting-off notification are output from the input/output control unit 104 to the transmitting/receiving unit 105, and transmitted to the center server 500 through the communication unit 15. Note that operation performed by the user who gets on the vehicle 100 is not limited to the above-described operation. For example, operation may be performed using speech.

The location information acquiring unit 106, for example, acquires location information of the vehicle 100 acquired by the GPS receiving unit 1E, or the like, with a predetermined period and transmits the location information to the center server 500. The location information of the vehicle 100 is, for example, latitude and longitude. Alternatively, the location information of the vehicle 100 may be, for example, address. Further, the location information of the vehicle 100 acquired by the location information acquiring unit 106 is, for example, also output to the operation plan control unit 102 and the traveling control unit 101.

The operation plan control unit 102 receives the operation command from the center server 500. The operation plan control unit 102 calculates a route for the vehicle 100 to take on the basis of the operation command and the location information of the own vehicle obtained by the location information acquiring unit 106 and generates an operation plan. The operation plan includes data relating to the route through which the vehicle 100 is to travel calculated in this manner, and data specifying processing which is to be performed by the vehicle 100 on part of the route or the whole route. Examples of the data included in the operation plan can include, for example, the following (1) and (2).

(1) Data in which Route Through which the Own Vehicle Travels is Expressed with Collection of Road Links The route through which the own vehicle travels may be, for example, automatically generated with reference to the stored map data on the basis of the provided place of departure, a place which the vehicle goes through and a destination. Note that calculation of the route through which the own vehicle travels may depend on processing of an external apparatus (for example, the center server 500) instead of depending on processing within the vehicle 100. In this case, the center server 500 acquires a location of the own vehicle from the vehicle 100, calculates a route for the vehicle 100 to take and puts the calculated route data in the above-described operation command.

(2) Data Expressing Processing to be Performed by the Own Vehicle at Point on Route While the processing to be performed by the own vehicle includes, for example, "letting the user get on/off" and "loading baggage", the processing is not limited to these. The operation plan generated by the operation plan control unit 102 is transmitted to the traveling control unit 101 which will be described later.

The environment detecting unit 103 detects environment information around the vehicle 100 to be used for autonomous traveling on the basis of data acquired by various kinds of sensors mounted on the vehicle 100. While targets of detection of the environment detecting unit 103 are, for example, information such as the number and locations of lanes, the number and locations of vehicles existing around the own vehicle, the number and locations of obstacles (such as, for example, pedestrians, bicycles, constructions and buildings) existing around the own vehicle, a structure of the road, and road signs, the targets are not limited to these. The targets of detection may be any information if the information is used for autonomous traveling. For example, in the case where the sensor is a stereo camera, an object around the vehicle 100 is detected by image data captured by the stereo camera being subjected to image processing. Further, the environment detecting unit 103 may track the detected object as well as simply detecting an object around the vehicle 100. Tracking is, for example, continuous detection of the detected target. For example, it is possible to obtain relative speed of the object from a difference between coordinate of the object detected one step before and current coordinate of the object. The data relating to an environment around the vehicle 100, detected by the environment detecting unit 103 is output to the traveling control unit 101 which will be described later.

The traveling control unit 101, for example, generates a control command for controlling autonomous traveling of the own vehicle on the basis of the operation plan generated by the operation plan control unit 102, the data relating to the environment around the vehicle 100 generated by the environment detecting unit 103 and the location information of the own vehicle acquired by the location information acquiring unit 106. For example, if a traveling start command is input from the operation plan control unit 102, the traveling control unit 101 generates a control command so as to cause the own vehicle to travel along a predetermined route and so that an obstacle does not enter a predetermined safe region centering around the own vehicle. The generated control command is transmitted to the drive motor 1C. As a method for generating a control command for causing the vehicle to autonomously travel, a publicly known method can be employed.

FIG. 6 is one example of the vehicle management information table. The vehicle management information table is stored in the vehicle management DB 504 of the center server 500. The vehicle management information table is a table which holds vehicle management information relating to the vehicles 100 within the vehicle control system 1. The vehicle management information table includes, for example, fields of a vehicle ID, an initial location, a current location, a service state, a service ID and a boarding user ID as the vehicle management information.

In the field of the vehicle ID, identification information of the vehicle 100 is input. The identification information of the vehicle 100 may be, for example, identification information allocated to each vehicle 100 in the vehicle control system 1 or may be number engraved on a number plate of the vehicle 100.

In the field of the initial location, location information of the initial location of the vehicle 100 is input. For example, in the case where service is completed and other service is not allocated, the vehicle 100 is controlled to return to the initial location. In the fields of the vehicle ID and the initial location, values are input in advance from an initial state of the vehicle management information table.

In the field of the current location, location information of the current location of the vehicle 100, received from the vehicle 100 with a predetermined period is input. The field of the current location is, for example, updated every time the location information is received from the vehicle 100 by the location information managing unit 502.

In the field of the service state, a value indicating a service state of the vehicle 100 is input. In the first embodiment, as the value indicating the service state of the vehicle 100, one of "not servicing" and "servicing" is input. The value "not servicing" indicates that service is not performed. The value "servicing" indicates that service is being performed. An initial value of the field of the service state is, for example, "not servicing". The field of the service state is, for example, updated by the operation control unit 503.

In the field of the service ID, identification information of service allocated to the vehicle 100 is input. The identification information of the service is, for example, provided by the request accepting unit 501 of the center server 500. In the field of the service ID, identification information of the allocated service is input in the case where the field of the service state is "servicing", while the field of the service state is blank in the case where the field of the service state is "not servicing". The field of the service ID is, for example, updated by the operation control unit 503. Note that there are other types of service in which the vehicle 100 is used other than the matching service, and the vehicle 100 can execute a plurality of types of service in parallel according to content of the service. Therefore, in the case where there are a plurality of types of service executed by the vehicle 100, identification information of a plurality of types of service is input in the field of the service ID. The field of the service ID is, for example, updated by the operation control unit 503.

In the field of the boarding user ID, identification information of a user who is on the vehicle 100 is input. A notification of user information of the user who is on the vehicle 100 is, for example, made from the vehicle 100 through a getting-on notification. The field of the boarding user ID is, for example, updated by the operation control unit 503 every time a getting-on notification or a getting-off notification is received for the vehicle 100.

<Processing Flow>

Figure 7:
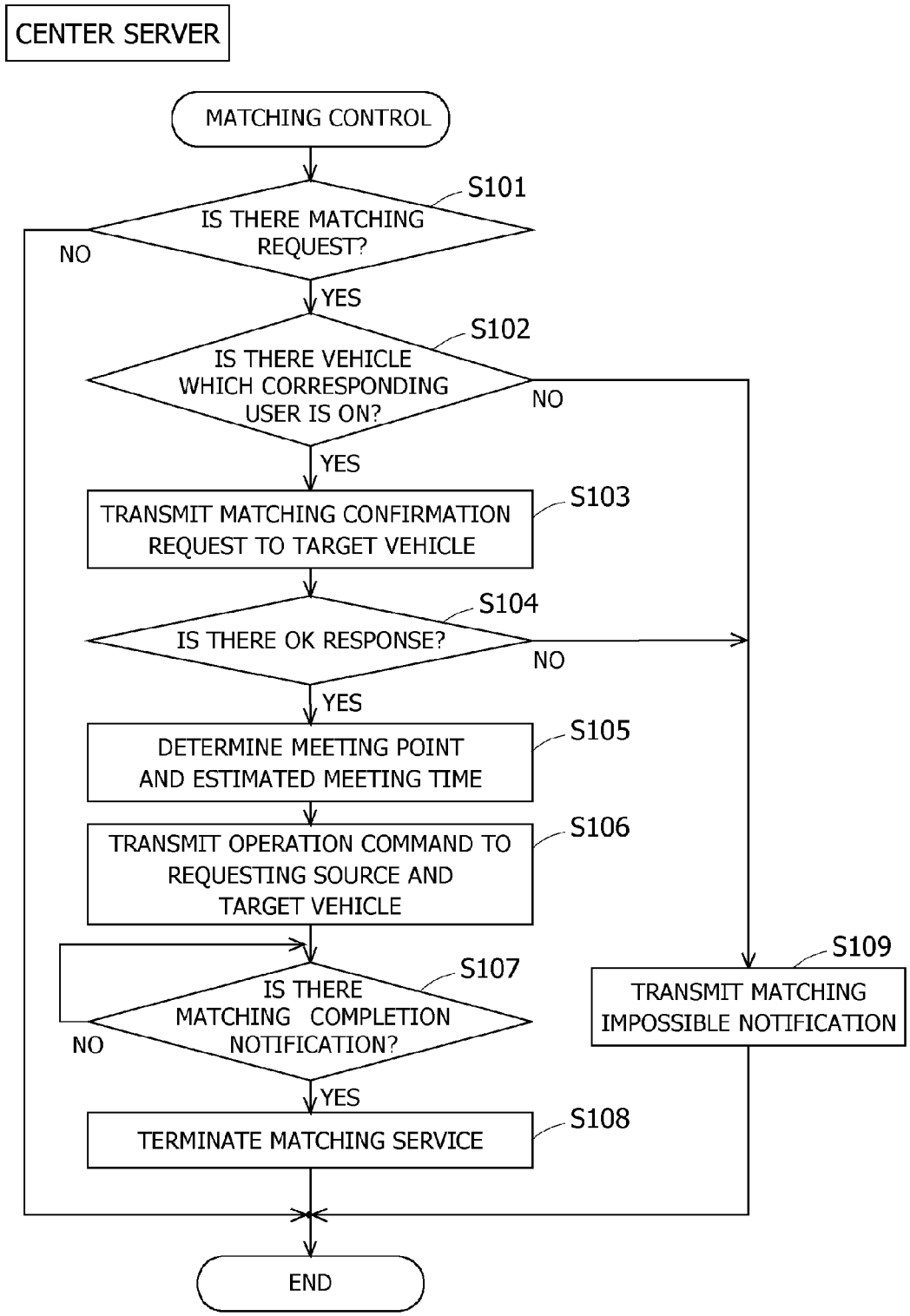
FIG. 7 is one example of a flowchart of matching control processing by the operation control unit of the center server.

FIG. 7 is one example of a flowchart of matching control processing by the operation control unit 503 of the center server 500. The processing illustrated in FIG. 7 is, for example, repeatedly executed with a predetermined period. While execution entity of the processing illustrated in FIG. 7 is the CPU 51 of the center server 500, the processing will be described assuming that the operation control unit 503 which is a functional component is entity for convenience sake. Note that this will similarly apply to description of the flowcharts in FIG. 7 and the subsequent drawings.

In S101, the operation control unit 503 determines whether a matching request is received or not. In the case where a matching request is received (S101: YES), the processing proceeds to S102. In the case where a matching request is not received (S101: NO), the processing illustrated in FIG. 7 is finished.

In S102, the operation control unit 503 determines whether there is a vehicle 100 which the target user is on from the vehicle management information table and the identification information of the target user received along with the matching request or not. In the case where there is a vehicle 100 which the target user is on (S102: YES), the processing proceeds to S103. In the case where the target user is on none of the vehicles 100 (S102: NO), the processing proceeds to S109.

In S103, the operation control unit 503 transmits a matching confirmation request to the vehicle 100 which the target user is on, specified in S102. The matching confirmation request is a request for confirming permission of meeting with the user who is the requesting source, to the target user. Along with the matching confirmation request, for example, identification information of the user who is the requesting source of the matching request is also transmitted. Hereinafter, the vehicle 100 which the target user is on will be referred to as a target vehicle of the matching request, or simply referred to as a target vehicle.

At the target vehicle of the matching request, if the matching confirmation request is received, for example, a message of the matching confirmation request from the user who is the requesting source and an icon for an OK or NG response are displayed on the display with the touch panel 16A. By the target user who is on the target vehicle of the matching request selecting an OK or NG icon, an OK or NG response is transmitted to the center server 500.

In S104, the operation control unit 503 determines whether an OK response is received from the target vehicle or not. In the case where an OK response is received from the target vehicle (S104: YES), the processing proceeds to S105. In the case where an OK response is not received from the target vehicle (S104: NO), that is, in the case where an NG response is received from the target vehicle, or in the case where neither an OK response nor an NG response is received although a predetermined time period has elapsed, the processing proceeds to S109.

In S105, the operation control unit 503 determines a meeting point and estimated meeting time. A method for determining the meeting point and the estimated meeting time is not limited to a specific method, and one of the publicly known methods may be used. For example, the meeting point may be determined at a midpoint of the current location of the vehicle 100 which is the requesting source and the current location of the target vehicle. Alternatively, while one of the vehicle 100 which is the requesting source and the target vehicle is executing other mobile service, the meeting point may be determined while location information of a destination of the other mobile service is taken into account. The current location of each vehicle 100 is stored in the vehicle management information table. Further, a value of the estimated meeting time is, for example, determined by calculating estimated arrival time of the meeting point of the vehicle 100 which is the requesting source or the target vehicle from a distance from the current location of the vehicle 100 which is the requesting source or the target vehicle to the meeting point and moving speed while regarding the moving speed as predetermined speed, and adding an allowable time period to the later time.

In S106, the operation control unit 503 transmits the operation command to the vehicle 100 which is the requesting source and the target vehicle. The operation command to be transmitted in S106 includes, for example, a move command for moving to the meeting point obtained in S105 until the estimated meeting time, and a meeting command for meeting with the target vehicle or the user who is the requesting source at the meeting point. Further, in S106, the operation control unit 503 updates the fields of the service state of the vehicle 100 which is the requesting source and the target vehicle in the vehicle management information table to "servicing", and inputs identification information of the matching service to the fields of the service ID.

In S107, the operation control unit 503 determines whether matching completion notifications are received from both the vehicle 100 which is the requesting source and the target vehicle or not. The matching completion notification is a notification indicating that the vehicle 100 which is the requesting source and the target vehicle 100 meet each other, and, for example, is transmitted from the vehicle 100 to the center server 500 by the user inputting the notification to the vehicle 100. In the case where the matching completion notifications are received from both the vehicle 100 which is the requesting source and the target vehicle (S107: YES), the processing proceeds to S108. In the case where the matching completion notifications are not received from both the vehicle 100 which is the requesting source and the target vehicle (S107: NO), the state becomes a standby state.

In S108, the operation control unit 503 finishes the matching service. Further, in S108, the operation control unit 503 deletes the identification information of the matching service from the fields of the service ID of the vehicle 100 which is the requesting source and the target vehicle in the vehicle management information table, and, in the case where the field of the service ID becomes blank, the field of the service state is updated to "not servicing". Thereafter, the processing illustrated in FIG. 7 is finished.

In S109, because the target user is on none of the vehicles 100 in S102 or an OK response is not received from the target vehicle in S104, the operation control unit 503 transmits a matching impossible notification indicating that matching is impossible to the vehicle 100 which is the requesting source. The matching impossible notification may include reason why matching is impossible. Thereafter, the processing illustrated in FIG. 7 is finished.

Figure 8:
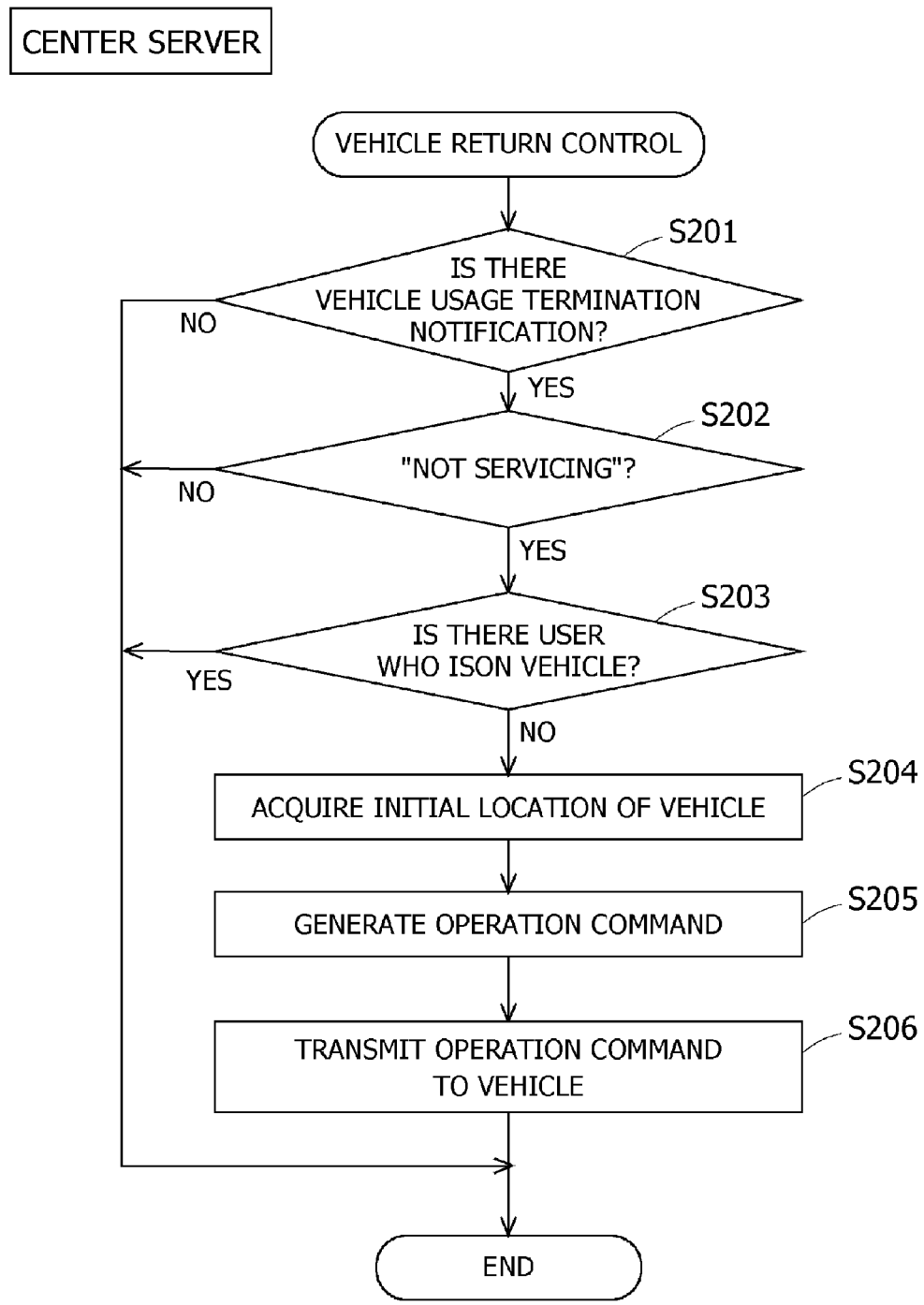
FIG. 8 is one example of a flowchart of vehicle return control processing by the operation control unit of the center server.

FIG. 8 is one example of a flowchart of vehicle return control processing by the operation control unit 503 of the center server 500. The vehicle return control processing is processing of controlling the vehicle 100 to return to the initial location in the case where the vehicle 100 is put into a state where service is not being performed. The processing illustrated in FIG. 8 is, for example, repeatedly executed with a predetermined period.

In S201, the operation control unit 503 determines whether a vehicle usage termination notification is received or not. The vehicle usage termination notification is a notification indicating that usage of the vehicle 100 by the user is finished, and, for example, input to the vehicle 100 by the user. More specifically, the vehicle usage termination notification is, for example, input to the vehicle 100 in the case where the user who is on the vehicle 100 gets off the vehicle 100. In the case where the vehicle usage termination notification is received (S201: YES), the processing proceeds to S202. In the case where the vehicle usage termination notification is not received (S201: NO), the processing illustrated in FIG. 8 is finished.

In S202, the operation control unit 503 determines whether a value of the field of the service state of the vehicle 100 is "not servicing" in the vehicle management information table or not. In the case where the value of the field of the service state of the vehicle 100 is "no servicing" (S202: YES), the processing proceeds to S203. In the case where the value of the field of the service state of the vehicle 100 is not "not servicing" (S202: NO), the processing illustrated in FIG. 8 is finished.

In S203, the operation control unit 503 determines whether the field of the boarding user ID is blank in the vehicle management information table or not, that is, whether there is a user who is on the vehicle 100 or not. In the case where there is a user who is on the vehicle 100 (S203: YES), the processing illustrated in FIG. 8 is finished. In the case where there is no user who is on the vehicle 100 (S203: NO), the processing proceeds to S204.

In S204, the operation control unit 503 acquires an initial location of the vehicle 100 from the vehicle management information table. In S205, the operation control unit 503 generates an operation command to the vehicle 100 which is a notification source. The operation command generated in S205 includes, for example, a command for moving to the initial location of the vehicle 100 acquired in S204. In S206, the operation control unit 503 transmits the operation command generated in S205 to the vehicle 100 which is the notification source. Thereafter, the processing illustrated in FIG. 8 is finished.

Specific Example

Figure 9:
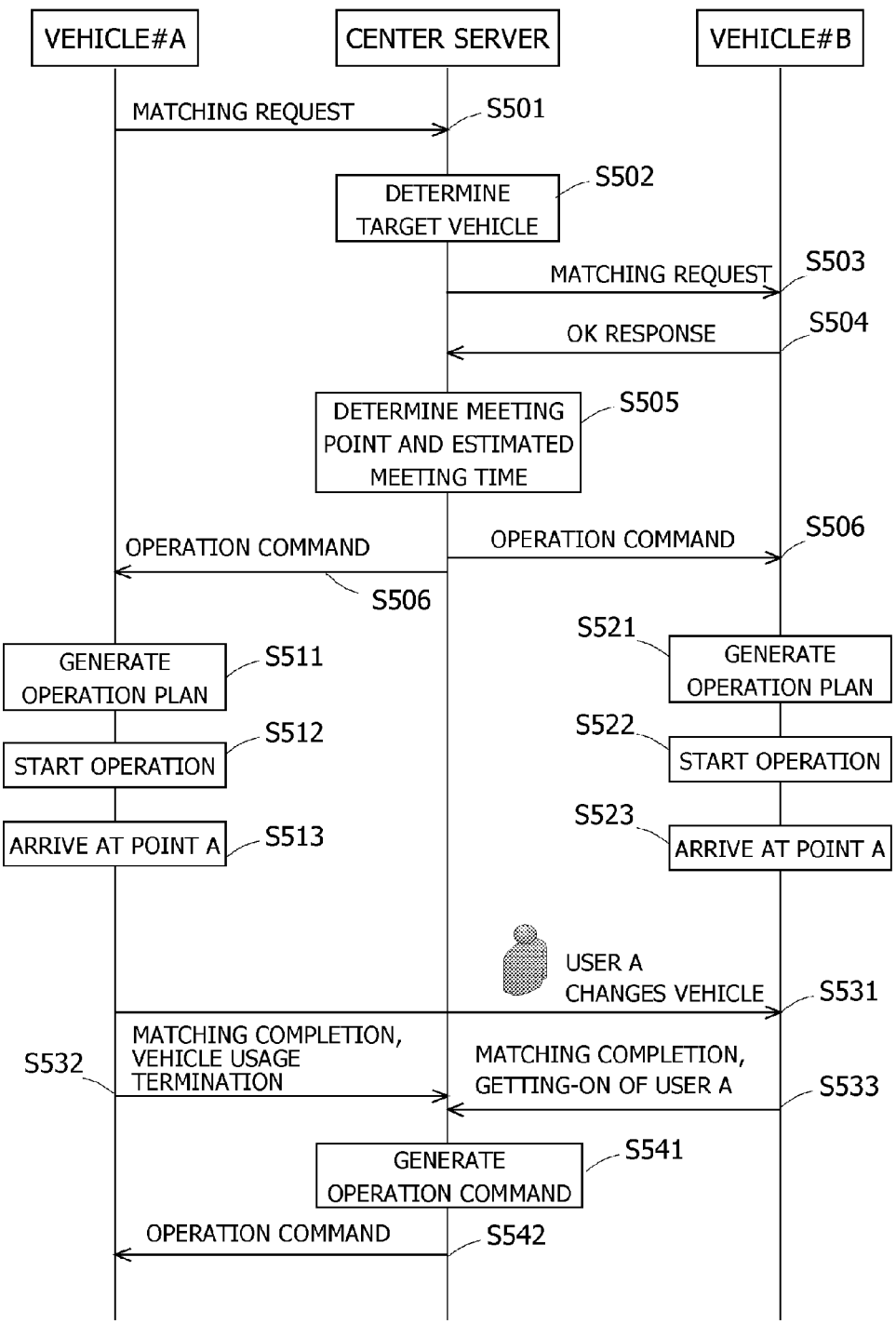
FIG. 9 is one example of a processing sequence in a specific example.

FIG. 9 is one example of a processing sequence in a specific example. In the specific example, it is assumed that a user A is on a vehicle #A, and a user B is on a vehicle #B. Further, the user A and the user B belong to the same organization, and the organization to which the both users belong subscribes to service provided by the vehicle control system 1. Therefore, the user A and the user B can utilize the vehicles 100, and can refer to utilization states of the vehicles 100 of each other. Further, it is assumed that none of the service is being executed at the vehicle #A and the vehicle #B.

In S501, the vehicle #A transmits a matching request for match with the user B to the center server 500 by input from the user A, and the center server 500 receives the matching request from the vehicle #A (FIG. 7, S101: YES). For example, a list of identification information of users belonging to the organization to which the user A and the user B belong is displayed on the display with the touch panel 16A of the vehicle #A, and the matching request for match with the user B is transmitted from the vehicle #A to the center server 500 by the user A selecting identification information of the user B who is the target of the matching request from the list.

In S502, the center server 500 determines the vehicle #B which the user B who is the target user of the matching request is on as the target vehicle of the matching request (FIG. 7, S102: YES). In S503, the center server 500 transmits a matching confirmation request to the vehicle #B (FIG. 7, S103). In S504, the user B inputs an OK response to the vehicle #B, the vehicle #B transmits an OK response to the center server 500, and the center server 500 receives the OK response from the vehicle #B (FIG. 7, S104: YES).

In S505, the center server 500 determines the meeting point of the vehicle #A and the vehicle #B and the estimated meeting time (FIG. 7, S105). In the present specific example, it is assumed that a point A is determined as the meeting point. In S506, the center server 500 generates an operation command and transmits the operation command to the vehicle #A and the vehicle #V (FIG. 7, S106). The operation command transmitted to the vehicle #A and the vehicle #B in S506 includes, for example, a move command for moving to the point A which is the meeting point until the estimated meeting time, and a meeting command for meeting with the vehicle #B or the vehicle #A at the point A.

In S511/S521, the vehicle #A/vehicle #B receives the operation command from the center server 500 and generates an operation plan. The operation plan created in S511/S521 includes, for example, a route to the meeting point A, meeting with the vehicle #B/vehicle #A at the meeting point A, or the like. In S512/S522, the vehicle #A/vehicle #B starts operation in accordance with the created operation plan. In S513/S523, the vehicle #A/vehicle #B arrives at the meeting point A and meets with the vehicle #B/vehicle A.

In S531, it is assumed that the user A moves from the vehicle #A to the vehicle #B, and usage of the vehicle #A is finished. Note that, when the user A gets off the vehicle #A, the user A inputs termination of usage of the vehicle #A and completion of the matching service by meeting with the vehicle #B to, for example, the display with the touch panel 16A of the vehicle #A. Further, the user A, for example, brings an IC card held by himself/herself closer to an IC card reader provided at the vehicle #A to cause the IC card reader to read identification information of the user himself/herself and record getting-off. The user A performs similar operation, for example, at the vehicle #B which the user A gets on next to cause getting-on to be recorded.

In S532, the vehicle #A transmits a matching service completion notification and a vehicle usage termination notification to the center server 500, and the center server 500 receives these (FIG. 8, S201: YES). Further, while illustrating is omitted, a getting-off notification of the user A is also transmitted from the vehicle #A to the center server

500. In S533, the vehicle #B transmits a matching service completion notification and a getting-on notification of the user A to the center server 500, and the center server 500 receives these (FIG. 7, S108).

Note that, for example, the user B inputs completion of the matching service by meeting with the vehicle #A to, for example, the display with the touch panel 16A of the vehicle #B. The vehicle #B creates a matching service completion notification and a getting-on notification of the user A in response to input from the user B and recording of getting-on of the user A.

Further, when the center server 500 receives the getting-off notification of the user A from the vehicle #A, the center server 500, for example, deletes identification information of the user A from the field of the boarding user ID corresponding to the vehicle #A in the vehicle management information table. When the center server 500 receives a getting-on notification of the user A from the vehicle #B, the center server 500, for example, adds identification information of the user A to the field of the boarding user ID corresponding to the vehicle #B in the vehicle management information table. Further, when the center server 500 receives the matching service completion notifications from the vehicle #A and the vehicle #B (FIG. 7, S108), the center server 500 updates the fields of the service state of the vehicle #A and the vehicle #B in the vehicle management information table to "not servicing". However, if the user A and the user B are continuously on the vehicle #B, and when a new request for mobile service is input from one of the users, the vehicle #B becomes "servicing" again.

In S541, the center server 500 generates an operation command including a move command for moving to an initial location, to the vehicle #A which receives the vehicle usage termination notification (FIG. 8, S205). In S542, the center server 500 transmits the operation command to the vehicle #A (FIG. 8, S206). When the vehicle #A receives the operation command from the center server 500, the vehicle #A starts operation to the initial location of the vehicle #A, so that the vehicle MA returns to the initial location.

Operation and Effect of First Embodiment

In the first embodiment, the user who is on the vehicle 100 can meet another user who is on another vehicle 100. The vehicle 100 is a vehicle which can autonomously travel, and, for example, the user who is on the vehicle 100 is highly likely to be moving to a predetermined destination. Therefore, for the user of the vehicle 100, a time period during which the user is on the vehicle 100 is highly likely to be a vacant time period, and the user can be relatively easily met. Therefore, by the users who are on the vehicles 100 being able to meet each other, it is possible to effectively use an idle time period of movement, or the like.

Further, for example, by one of points (for example, a midpoint), or the like, between the current points of the respective vehicles 100 being set as a meeting point of the two vehicles 100, the vehicles can meet each other more quickly. Further, because the center server 500 determines the estimated meeting time and notifies each vehicle 100 of the estimated meeting time as part of the operation command, the users who are on the respective vehicles 100 can know estimated time at which the users meet each other.

Further, by transmitting matching request confirmation to the vehicle 100 which is the target of the matching request and confirming meeting with the user who is the requesting source, to the user who is the target of the matching request, it is possible to determine whether or not the users meet each other in accordance with a state of the user who is the target of the matching request.

Further, in the first embodiment, in the case where the user of one of the vehicle 100 which is the requesting source of the matching request and the target vehicle 100 moves to the other vehicle 100, the vehicle 100 which the user is not on is controlled to return to the initial location. By this means, because the vehicle 100 returns to the initial location determined in advance when the service is finished, the vehicle 100 can be easily managed.

Second Embodiment

Figure 10:
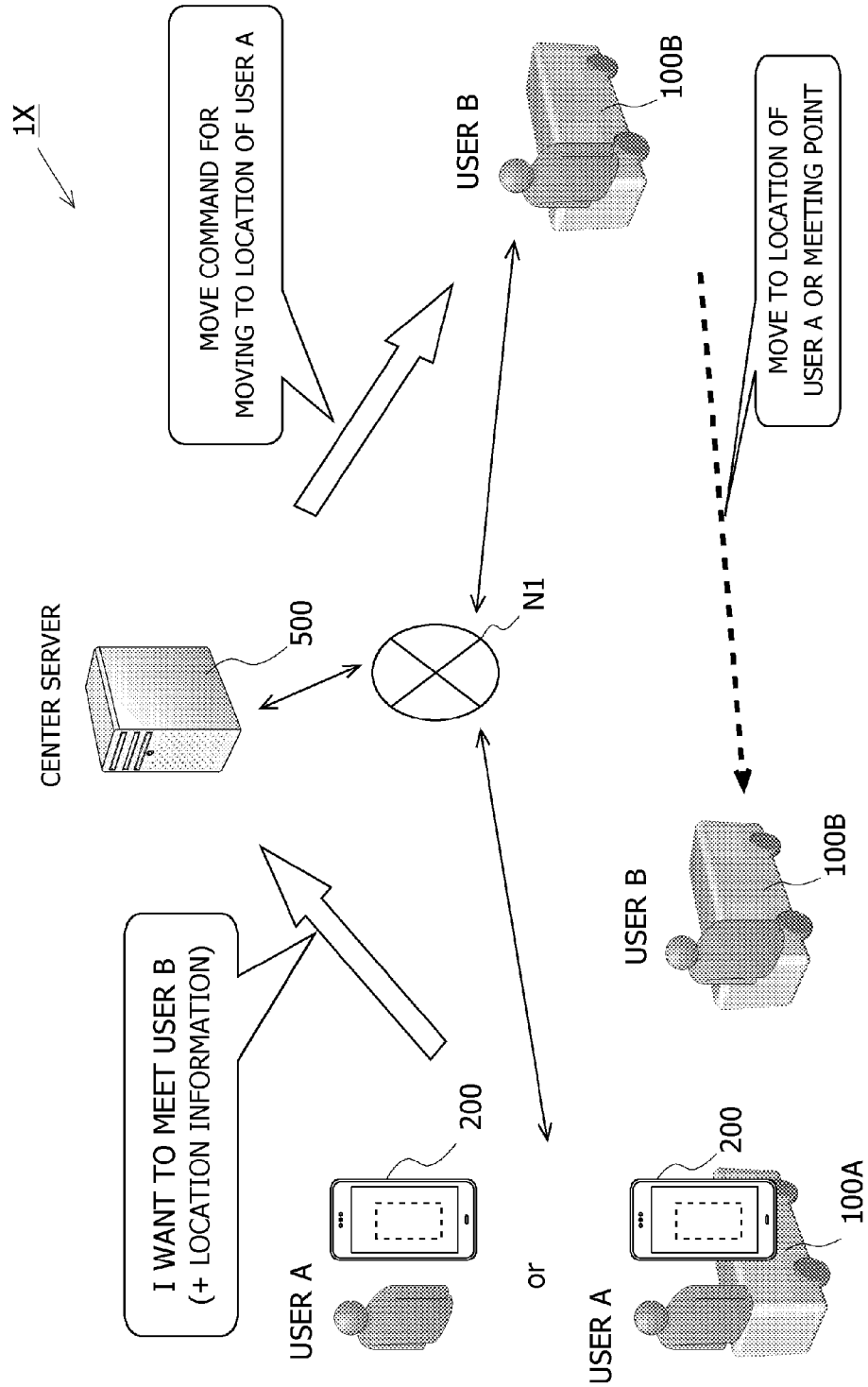
FIG. 10 is a diagram illustrating one example of a system configuration of a vehicle control system according to a second embodiment.

FIG. 10 is a diagram illustrating one example of a system configuration of a vehicle control system 1X according to a second embodiment. The vehicle control system 1X according to the second embodiment includes a user terminal 200. In the second embodiment, a matching request for match with a user who is on the vehicle 100 is transmitted from the user terminal 200 to the center server 500. The matching request transmitted from the user terminal 200 includes identification information of the target user and location information of the user terminal 200.

Processing of the center server 500 is substantially similar to that in the first embodiment. Specifically, when the center server 500 receives the matching request from the user terminal 200, the center server 500 specifies the vehicle 100 which the user who is the target of the matching request is on and transmits a matching confirmation request to the vehicle 100. When the center server 500 receives an OK response from the vehicle 100 which is the target of the matching request, the center server 500 determines a meeting point and transmits an operation command including a move command for moving to the meeting point, to the vehicle 100 which is the target of the matching request.

The meeting point at which the user who is the requesting source and the vehicle 100 which is the target of the matching request meet each other may be, for example, a current location of the user terminal 200 which is the requesting source or may be determined on the basis of the current location of the user terminal 200 which is the requesting source and the current location of the vehicle 100 which is the target of the matching request. The move command for moving to the meeting point may be also transmitted to the user terminal 200 which is the requesting source in accordance with the meeting point.

The user terminal 200 is, for example, a smartphone, a tablet terminal, or the like. In the user terminal 200, for example, an application program for utilizing matching service is installed, and the matching request can be transmitted through execution of the application program.

The user terminal 200, for example, transmits a matching request, a matching service completion notification, or the like, to the center server 500 in accordance with input from the user. The user terminal 200 in the second embodiment is one example of a "user terminal of a second user".

Figure 11:
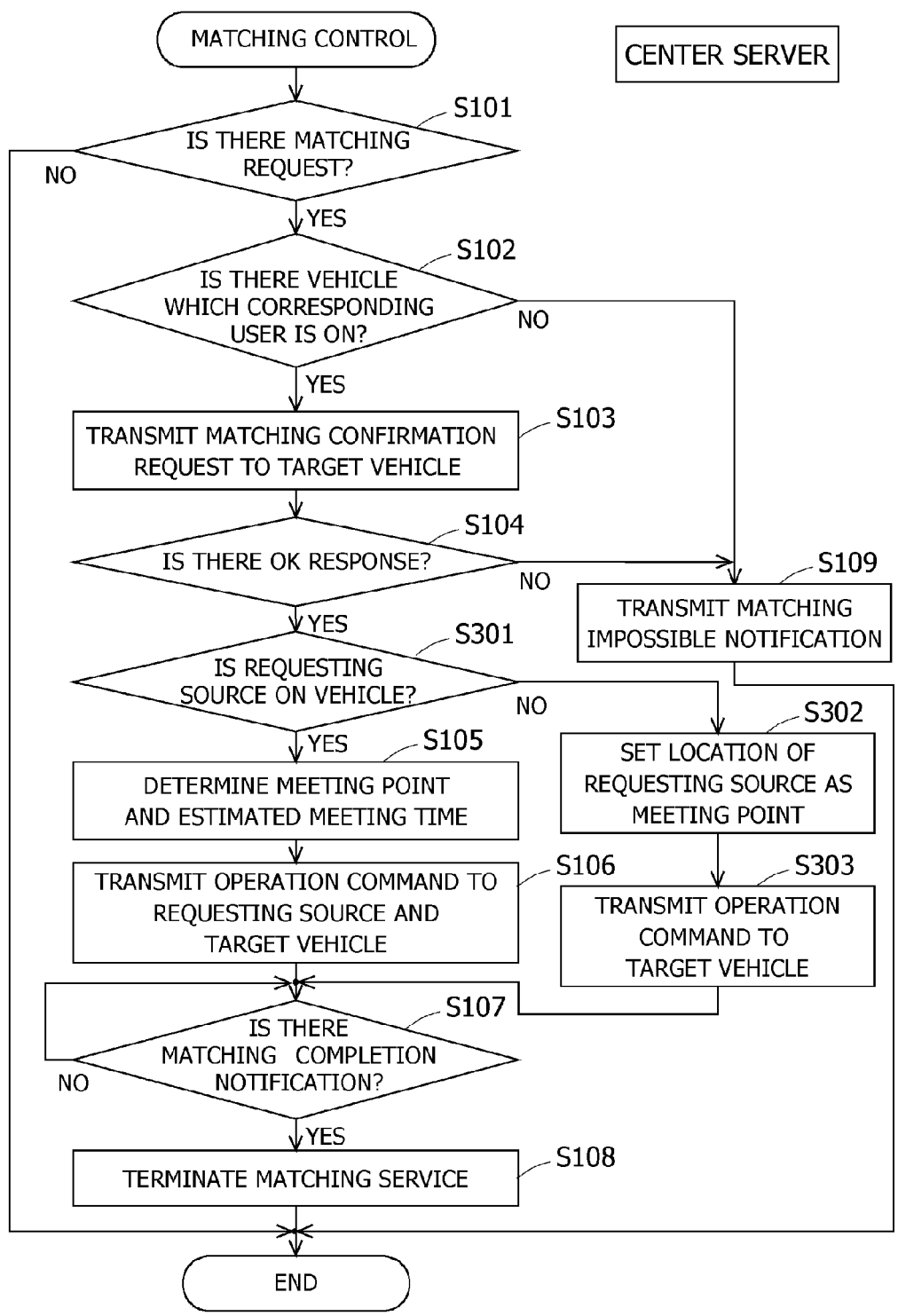
FIG. 11 is one example of a flowchart of matching control processing by the operation control unit of the center server according to the second embodiment.

FIG. 11 is one example of a flowchart of matching control processing by the operation control unit 503 of the center server 500 according to the second embodiment. In the flowchart illustrated in FIG. 11, the same reference numerals are assigned to processing which is the same as that in the matching control processing in the first embodiment illustrated in FIG. 7. The processing illustrated in FIG. 11 is also repeatedly executed with a predetermined period.

The processing from S101 to S104 is as described in FIG. 7. However, in FIG. 11, the transmission source of the matching request is the user terminal 200. That is, the operation control unit 503 receives a matching request from the user terminal 200 (S101: YES), specifies a target vehicle which the user who is a target of the matching request is on (S102: YES), transmits a matching confirmation request to the target vehicle (S103), and receives an OK response from the target vehicle (S104: YES). Note that processing is similar to that in the first embodiment also in that, in the case where the user who is the target of the matching request is on none of the vehicles 100 (S102: NO), or in the case where an NG response is received from the target vehicle (S104: NO), the operation control unit 503 transmits a matching impossible notification of the user terminal 200 which is the requesting source (S109).

In S301, the operation control unit 503, for example, determines whether the user of the user terminal 200 which is the requesting source is on one of the vehicles 100 with reference to the vehicle management information table or not. In the case where the user of the user terminal 200 which is the requesting source is on one of the vehicles 100 (S301: YES), the processing proceeds to S105, processing similar to S105 to S108 in FIG. 7 is performed on the vehicle 100 which the user who is the requesting source is on and the target vehicle. That is, the operation control unit 503 determines the meeting point and the estimated meeting time on the basis of the current locations of the vehicle 100 which the user who is the requesting source is on and the target vehicle (S105), transmits the operation command to the both vehicles 100 (S106), and finishes the service (S108) when matching service completion notifications are received from the both the vehicles 100 or the user terminal 200 which is the requesting source and the target vehicle (S107: YES).

In the case where the user of the user terminal 200 which is the requesting source is on none of the vehicles 100 (S301: NO), the processing proceeds to S302. In S302, the operation control unit 503 sets the current location of the user terminal 200 which is the requesting source as the meeting point. In S303, the operation control unit 503 transmits the operation command to the target vehicle. Thereafter, the processing proceeds to S107, and, when the operation control unit 503 receives the matching service completion notifications from the user terminal 200 which is the requesting source and the target vehicle (S107: YES), the operation control unit 503 finishes the service (S108). Note that the meeting point is not limited to, for example, the location of the user terminal 200 which is the requesting source, and may be located between the current location of the user terminal 200 which is the requesting source and the current location of the vehicle 100 which is the target of the matching request.

According to the second embodiment, even a user who is not on the vehicle 100 can utilize matching service for meeting a user who is on the vehicle 100.

Modified Example of Second Embodiment

In the second embodiment, in the case where the user of the user terminal 200 which is the requesting source is not on the vehicle 100, for example, the vehicle which is the target of the matching request moves toward the location of the user terminal 200 to let the user who is the requesting source and the user who is the target of the matching request meet each other. In place of this, in the case where the user of the user terminal 200 which is the requesting source is not on the vehicle 100, for example, the center server 500 may head the vehicle 100 to the location of the user terminal 200, cause the user to get on the vehicle 100 and head the vehicle 100 to the meeting point.

Figure 12:
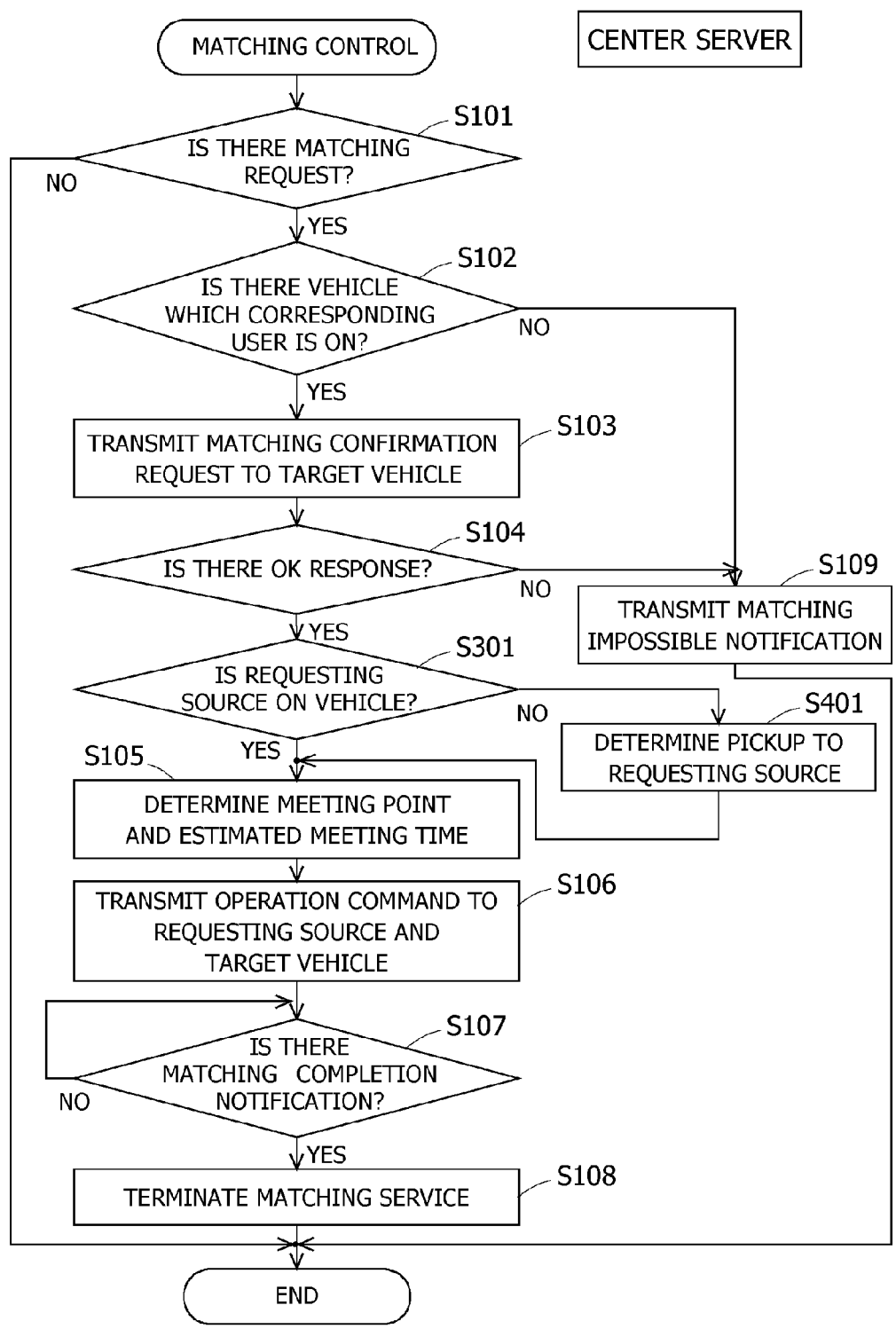
FIG. 12 is one example of a flowchart of matching control processing by the operation control unit of the center server according to the modified example of the second embodiment.

FIG. 12 is one example of a flowchart of matching control processing by the operation control unit 503 of the center server 500 according to the modified example of the second embodiment. In the flowchart illustrated in FIG. 12, the same reference numerals are assigned to processing which is the same as that in the matching control processing illustrated in FIG. 7 and FIG. 11. The processing illustrated in FIG. 12 is also repeatedly executed with a predetermined period.

Processing from S101 to S104 and S301 is as described in FIG. 11. As processing in the case where the user of the user terminal 200 which is the requesting source is on one of the vehicles 100 (S301: YES), as described in FIG. 11, processing similar to S105 to S108 in FIG. 7 is performed on the vehicle 100 which the user who is the requesting source is on and the target vehicle.

In the case where the user of the user terminal 200 which is the requesting source is on none of the vehicles 100 (S301: NO), the processing proceeds to S401. In S401, the operation control unit 503 determine pickup to the location of the user terminal 200 which is the requesting source. For example, for pickup to the location of the user terminal 200 which is the requesting source, a vehicle 100 in which "not servicing", which none of users is on, and which is located closest to the location of the user terminal 200 is selected.

Subsequent processing from S105 to S108 is as described in FIG. 11. That is, the operation control unit 503 determines a meeting point and estimated meeting time on the basis of current locations of a pickup vehicle 100 to be headed to the user terminal 200 which is the requesting source and the target vehicle (S105), transmits an operation command to the both vehicles 100 (S106), and finishes the service (S108) when the operation control unit 503 receives matching service completion notifications from the both vehicles 100 or the user terminal 200 which is the requesting source and the target vehicle (S107: YES).

Note that, in this case, in S106, the operation command to be transmitted to the pickup vehicle 100 to be headed to the user terminal 200 which is the requesting source includes, for example, a move command for moving to the location of the user terminal 200 which is the requesting source, a getting-on command for the user at the location of the user terminal 200, a move command for moving to the meeting point from the location of the user terminal 200, and a meeting command for meeting with the vehicle 100 which is the target of the matching request at the meeting point.

According to the modified example of the second embodiment, in the case where the user of the user terminal 200 which is the requesting source is not on the vehicle 100, by heading the vehicle 100 to the user and causing the vehicle 100 to move the user to the meeting point, it is possible to let the user who is the requesting source and the user who is the target of the matching request meet each other sooner.

<Others>

In the first embodiment and the second embodiment, in the case where the user transmits the matching request, identification information of the user who is the target of the matching request is directly input to the vehicle 100 or the user terminal 200 or is designated by the user being selected from a list of the users belonging to the same organization. In place of this, for example, before the matching request is made, the user who is the requesting source may request a list of users who are on the vehicles 100 to the center server 500 through the vehicle 100 or the user terminal 200 and may select a user who becomes the target of the matching request from the list.

Further, while, in the first embodiment and the second embodiment, an individual user is designated as the target of the matching request, the present disclosure is not limited to this, and, for example, attribute of the user such as a "user who belongs to a department A" can be designated as the target of the matching request. Further, it is also possible to designate a plurality of users as the target of the matching request.

Further, while, in the first embodiment and the second embodiment, it is assumed that the vehicle 100 is an EV palette, the vehicle 100 may be, for example, a manned-driven car. In this case, for example, a data communication apparatus is mounted on the car, and the data communication apparatus may perform processing (such as, for example, communication with the center server 500) similar to that of the vehicle 100 in the first embodiment or the second embodiment. Alternatively, it is also possible to cause a user terminal possessed by a user who is on the vehicle, such as a driver of the car to perform processing of the vehicle 100 (such as, for example, communication with the center server 500) in the first embodiment or the second embodiment.

<Recording Medium>

A program for causing a computer, other machine and an apparatus (hereinafter, a computer, or the like) to implement the above-described vehicle control can be recorded in a computer readable recording medium. By causing the computer, or the like, to read and execute the program in the recording medium, the computer functions as the above-described center server 500.

Here, the computer readable recording medium refers to a non-transitory recording medium in which information such as data and programs is accumulated through electric, magnetic, optical, mechanical or chemical action and from which the information can be read from a computer, or the like. Among such a recording medium, examples of a recording medium which is detachable from the computer, or the like, can include, for example, a flexible disk, a magnetooptical disk, a CD-ROM, a CD-R/W, a DVD, a blu-ray disk, a DAT, an 8 mm tape, a memory card such as a flash memory, or the like. Further, examples of a recording medium fixed at the computer, or the like, can include a hard disk, a ROM (read only memory), or the like. Still further, an SSD (Solid State Drive) can be utilized both as a recording medium which is detachable from the computer, or the like, and a recording medium which is fixed at the computer, or the like.

What is claimed is:

1. A vehicle control system comprising:
a plurality of vehicles that obtain identification information of users from integrated circuit (IC) cards carried by the users upon entering and exiting any of the plurality of vehicles,
wherein each of the plurality of vehicles is a vehicle which can autonomously travel based on a move command;
a storage that stores information relating to each of the plurality of vehicles, the information including whether each vehicle of the plurality of vehicles is carrying one of the users or not and the identification information of the users who are on each vehicle;
at least one processor configured to:
receive a request for meeting a first user from a second user and identification information of the first user;
determine whether the first user is riding on any one of the plurality of vehicles;
specify, when the first user is riding on any one of the plurality of vehicles, a first vehicle which is carrying the first user based on the information stored in the storage;
determine whether the second user is riding on any one of the plurality of vehicles;
specify, when the second user is riding on any one of the plurality of vehicles, a second vehicle which is carrying the second user based on the information stored in the storage;
determine a meeting point for meeting with the requesting source,
wherein the meeting point is a midpoint located on a route between a current location of the first vehicle and a current location of the second vehicle; and
perform control on the first vehicle and the second vehicle so as to let the first user and the second user meet each other by transmitting a first move command for moving to the meeting point to the first vehicle and transmitting a second move command for moving to the meeting point to the second vehicle.

2. The vehicle control system according to claim 1, wherein the meeting request is requested by a user terminal of a second user.

3. The vehicle control system according to claim 1, wherein if the meeting request is requested by a user terminal of a second user who is on none of the plurality of vehicles,
the at least one processor is further configured to transmit a move command for moving to a location of the user terminal, a getting-on command for the second user at the location of the user terminal, and a move command for moving to the meeting point from the location of the user terminal, to a different vehicle other than the first vehicle among the plurality of vehicles.

4. The vehicle control system according to claim 1, wherein, in a case where the first vehicle and the second vehicle meet each other at the meeting point, and one of the first user and the second user changes the vehicle to the second vehicle or the first vehicle, the at least one processor is further configured to transmit a move command for moving to a predetermined location to one of the first vehicle and the second vehicle, which a user is not on.

5. The vehicle control system according to claim 1, wherein, the at least one processor is further configured to request confirmation of the meeting request of the first vehicle and, when a response is received from the first vehicle, the at least one processor is configured to perform the control on the first vehicle.

6. A vehicle control method executed by a control apparatus that controls a plurality of vehicles, comprising:
obtaining identification information of users from integrated circuit (IC) cards carried by the users upon entering and exiting any of the plurality of vehicles,
wherein each of the plurality of vehicles is a vehicle which can autonomously travel based on a move command;
storing information relating to each of the plurality of vehicles in a storage, the information including whether each vehicle of the plurality of vehicles is carrying one of the users or not and the identification information users who are on each vehicle;
receiving a request for meeting a first user from a second user and identification information of the first user;

determining whether the first user is riding on any one of the plurality of vehicles;

specifying, when the first user is riding on any one of the plurality of vehicles, a first vehicle which is carrying the first user based on the information stored in the storage;

determining whether the second user is riding on any one of the plurality of vehicles;

specifying, when the second user is riding on any one of the plurality of vehicles, a second vehicle which is carrying the second user based on the information stored in the storage;

determine a meeting point for meeting with the requesting source,
  wherein the meeting point is a midpoint located on a route between a current location of the first vehicle and a current location of the second vehicle; and performing control on the first vehicle and the second vehicle so as to let the first user and the second user meet each other by transmitting a first move command for moving to the meeting point to the first vehicle and transmitting a second move command for moving to the meeting point to the second vehicle.

\* \* \* \* \*